United States Patent
Miura (10) Patent No.: US 7,389,864 B2
(45) Date of Patent: Jun. 24, 2008

(54) ONE-WAY CLUTCH SPRING

(75) Inventor: Yoshihisa Miura, Yamatokoriyama (JP)

(73) Assignee: JTEKT Corporation, Osaka (JP)

( * ) Notice: Subject to any disclaimer, the term of this patent is extended or adjusted under 35 U.S.C. 154(b) by 108 days.

(21) Appl. No.: 10/541,682

(22) PCT Filed: Jan. 9, 2004

(86) PCT No.: PCT/JP2004/000132

§ 371 (c)(1),
(2), (4) Date: Sep. 8, 2005

(87) PCT Pub. No.: WO2004/063589

PCT Pub. Date: Jul. 29, 2004

(65) Prior Publication Data

US 2006/0118379 A1  Jun. 8, 2006

(30) Foreign Application Priority Data

Jan. 9, 2003  (JP)  ............................. 2003-003630
Jan. 16, 2003  (JP)  ............................. 2003-007826

(51) Int. Cl.
*F16D 41/07* (2006.01)

(52) U.S. Cl. ....................... 192/45.1; 267/163
(58) Field of Classification Search ............... 192/45.1, 192/41 A; 188/82.8
See application file for complete search history.

(56) References Cited

U.S. PATENT DOCUMENTS 4,880,093 A * 11/1989 Message ................. 192/45.1
2003/0006114 A1 * 1/2003 Miura et al. ............. 192/45.1

FOREIGN PATENT DOCUMENTS

JP  2-76234  6/1990
JP  7-103261  4/1995

* cited by examiner

*Primary Examiner*—Rodney H Bonck
(74) *Attorney, Agent, or Firm*—Jordan and Hamburg LLP (57) ABSTRACT

A one-way clutch spring intended to reduce drag torque of one-way clutches. Tongues extend within pockets in which engagement members are disposed are bent in advance radially inward when they are disposed in an annular space so as to have bends at a proximal end and to form an angle of inclination ($\alpha$) of 20°-30° with a base. Further, the angle of inclination ($\beta$) with the base increases to exceed the angle of inclination ($\alpha$) by an amount of 5°-15° when engagement members contact the tongues. Further, the height of the front end of the tongue relative to the base is greater than that of a top of the second bend to the base, and the three bends each have their center of curvature positioned on the side of an inner ring with the base used as a reference and their radius of curvature is 0.2 mm-0.6 mm.

2 Claims, 8 Drawing Sheets

ONE-WAY CLUTCH SPRING

TECHNICAL FIELD

The present invention relates to a spring used in a one-way clutch which is placed between an inner ring and an outer ring, which comprises engagement members that exert a wedge function to transmit a power between the inner and outer rings, and that cancel the wedge function to interrupt the power transmission between the inner and outer rings, and which urges the engagement member, and more particularly to a one-way clutch spring which can reduce a drag torque (friction torque) of the engagement members that is generated when a power of a one-way clutch is transmitted or interrupted.

BACKGROUND ART

When power transmission and interruption between an inner ring and an outer ring are to be repeated, a one-way clutch is usually placed between the inner and outer rings.

Figure 6A:
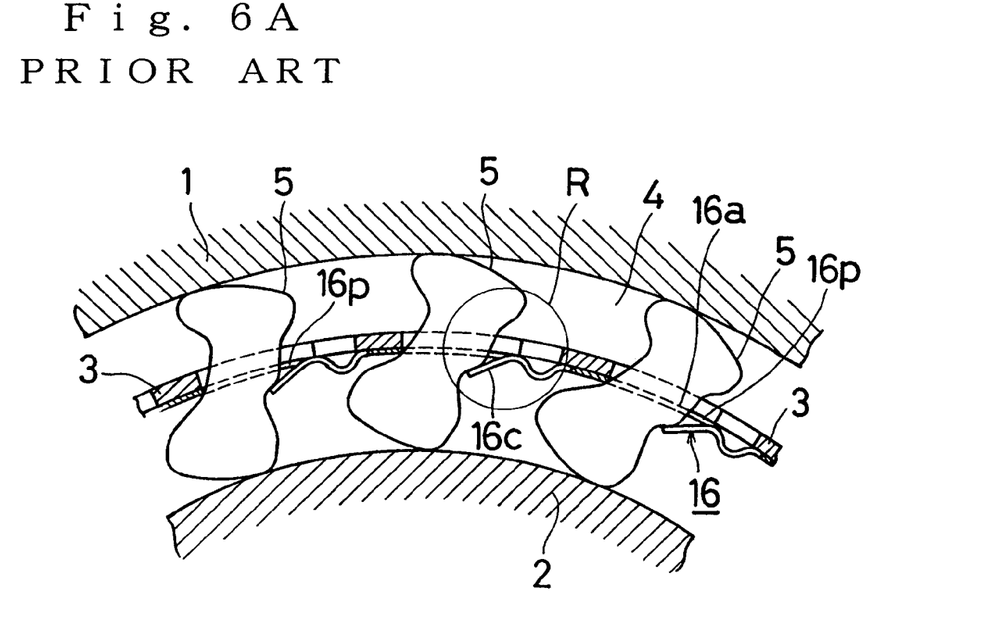
FIG. 6(A) is a partial section view.
Figure 6B:
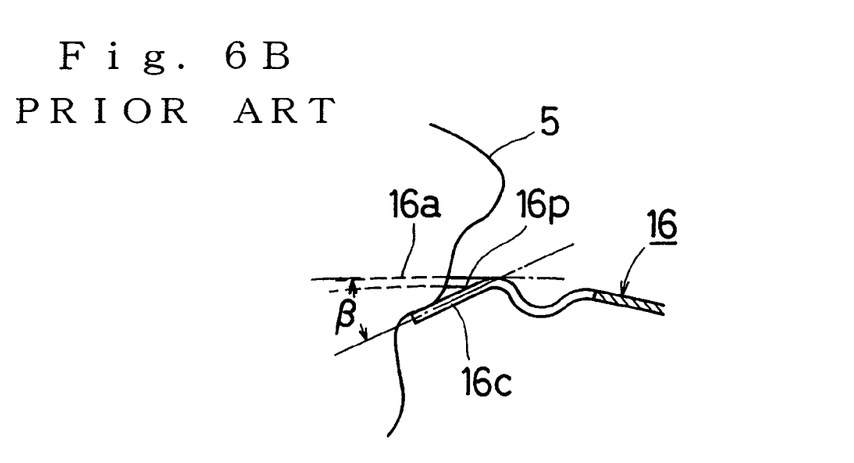
FIG. 6(B) is an enlarged view of portion R in FIG. 6(A).

FIG. 6(A) is a partial section view of a one-way clutch configured by a cage 3, a spring (ribbon spring) 16, and sprags 5 serving as engagement members, and FIG. 6(B) is an enlarged view of portion R in FIG. 6(A). In the one-way clutch, in order to enable the cage 3 to synchronize with the rotation of the outer ring, it is common to employ a configuration where a flange portion which is not illustrated, and which radially extends is disposed in, for example, an end portion of the cage 3 to provide a fastening zone, and the cage is pressingly inserted into the outer ring 1. One or two cages 3 (an outer cage and an inner cage) are used. In any case, the engagement members 5 (hereinafter, referred to as sprags 5) are placed in pocket 16p which are disposed on the spring 16 circumferentially at regular intervals, and urged in the engagement direction (wedge function direction) by tongues 16c disposed in the spring 16.

Figure 7:
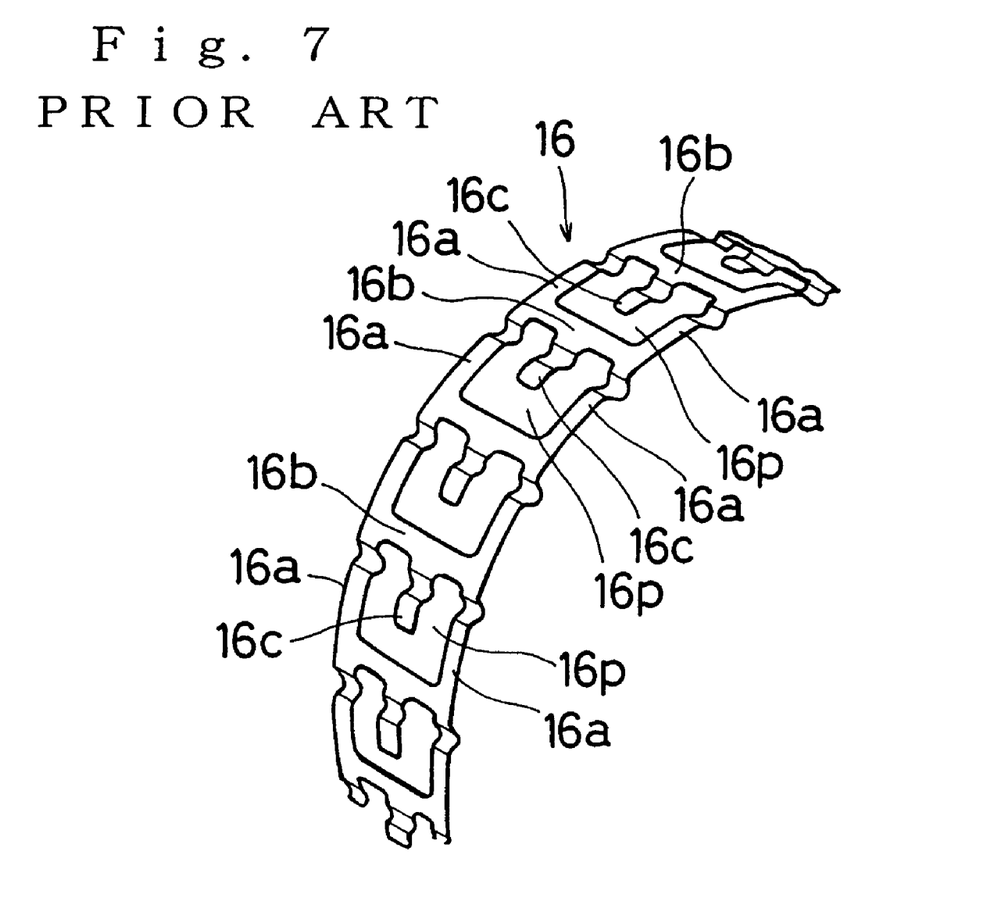
FIG. 7 is a partial perspective view of a spring used in a conventional one-way clutch.
Figure 8A:
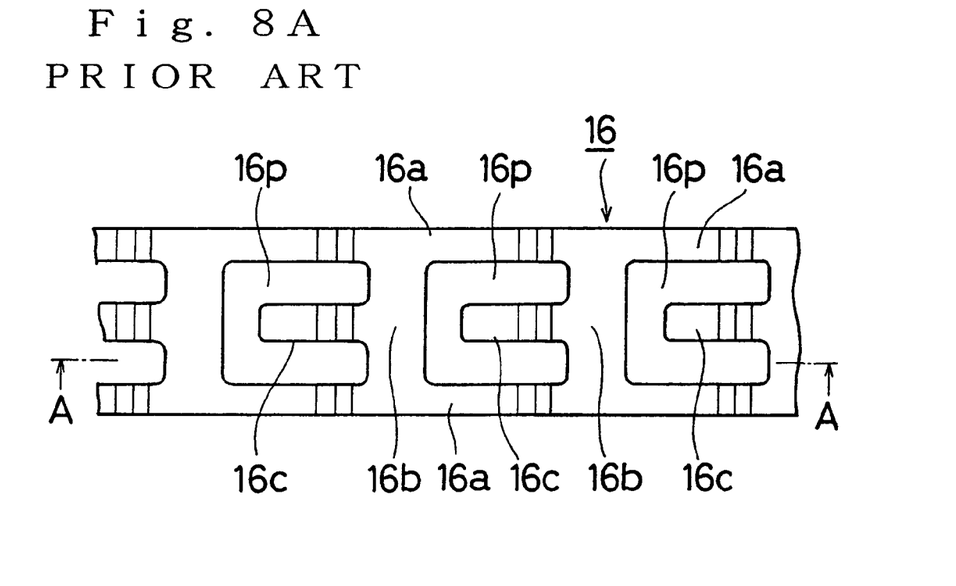
FIG. 8(A) is a plan view which is developed in the circumference direction.
Figure 8B:
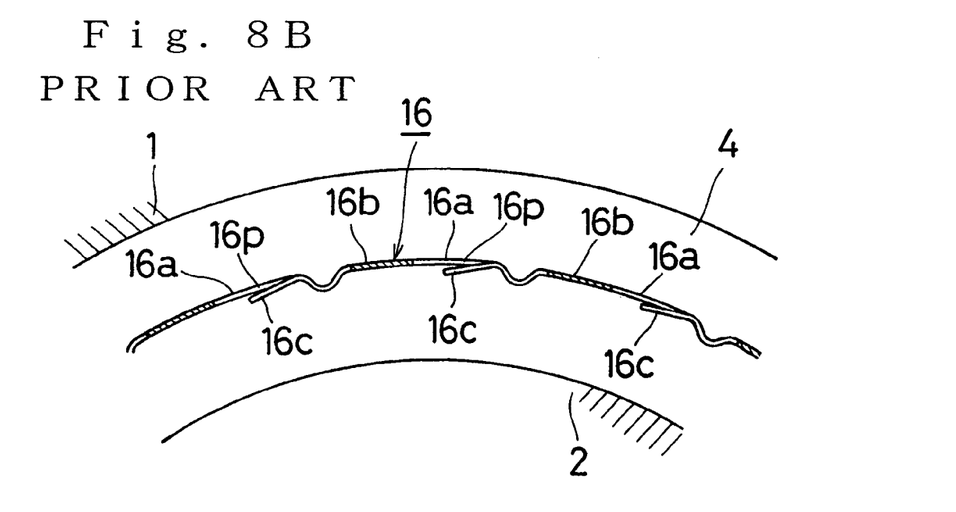
FIG. 8(B) is a section view taken along the line A-A of FIG. 8(A).

FIG. 7 is a partial perspective view of the spring 16, FIG. 8(A) is a plan view which is developed in the circumference direction of the spring 16, and FIG. 8(B) is a section view taken along the line A-A of FIG. 8(A) and a partial section view showing a state where the spring is actually placed in a one-way clutch (the sprags 5 are not placed).

In the spring 16, a thin metal plate member (for example, stainless steel), and bases 16a, 16a which are annular when incorporated, columns 16b, 16b, ... which connect the base 16a and the base 16a, pockets 16p, 16p, ... which are formed between the base 16a, 16a, ... and the columns 16b and disposed circumferentially at regular intervals, and tongues 16c, 16c, ... which elongate from center portions of the columns 16b toward the pockets are formed by press working. In this case, the configuration where the tongues 16c have tongues 16c which are previously inward bent before the spring 16 is placed in an annular space 4 has been conventionally known (see Japanese Utility Model Application (Kokai) No. HEI2-76234).

Figure 9:
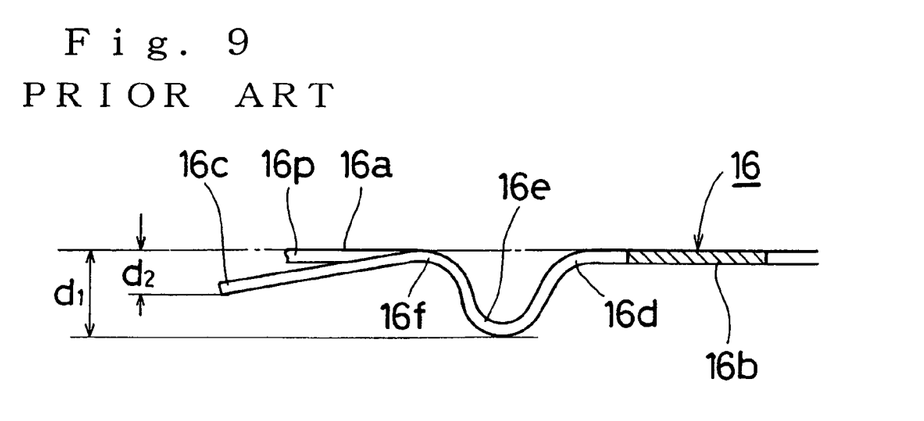
FIG. 9 shows a part of a conventional spring in a state where sprags are not placed, and a view showing portion R of FIG. 6(A).

In each of the tongues 16c, three meandering bends (16d, 16e, 16f) are formed from a basal end portion of the column 16d. In such a case, usually, it is most frequent that, as shown in FIG. 9, the height $d_2$ of a tip end portion of the tongue 16c to the base 16a is smaller than the height $d_1$ of the second meandering bend 16e to the base 16a, and, in a state where the sprag 5 is urged, the height $d_2$ of the tip end portion of the tongue 16c to the base 16a is larger than $d_1$.

In a one-way clutch, a drag torque (friction torque) is inevitably generated in power transmission and interruption between inner and outer rings. In a one-way clutch, the drag torque depends on a spring force (spring constant) of a tongue of a spring which urges a sprag in the engagement direction. Specifically, when an urging force of a tongue is made large (a spring constant is made large), the engagement property of a sprag is good, but the drag torque is large. By contrast, when the urging force of the tongue is excessively small, the engagement property of the sprag is impaired, and an engagement failure occurs. Therefore, a one-way clutch in which a drag torque is made as small as possible while maintaining the engagement property is requested. Recently, from the viewpoint of energy saving, friction loss must be reduced, and, also in a sprag type one-way clutch, a drag torque must be reduced as far as possible. In a one-way clutch for a torque converter or the like, disengage type sprags are used, but reduction of a drag torque in a low rotation zone is not sufficient.

The invention has been conducted in order to cope with the above-discussed problems. It is an object of the invention to provide a one-way clutch spring which has a high engagement property, and in which a drag torque (friction torque) is considerably lower than the conventional one.

DISCLOSURE OF THE INVENTION

In order to solve the problems, the invention provides a one-way clutch spring which is placed in an annular space between an outer ring and an inner ring, in which engagement members are placed respectively in pockets disposed circumferentially at regular intervals, and which has tongues that elongate respectively into the pockets, and that urge the engagement members toward an engagement side, and is characterized in that each of the tongues that elongate into the pockets has a bend which is previously bent toward a side that will be inside, before placed in the annular space, and is disposed so that an inclination angle to a base is 20° to 30°.

The invention is further characterized in that each of the tongues that elongate into the pockets has a spring constant in a range where an inclination angle to the base when the engagement member placed in the annular space is urged is further increased in a range of 5° to 15° with respect to an inclination angle to the base in a state where it is previously bent toward the side that will be inside, before placed in the annular space.

The invention still further provides a one-way clutch spring which is placed in an annular space between an outer ring and an inner ring, in which engagement members are placed respectively in pockets disposed circumferentially at regular intervals, and which has tongues that elongate respectively into the pockets, and that urge the engagement members toward an engagement side, and is characterized in that each of the tongues that elongate into the pockets has a first bend, a second bend, and a third bend as seen from a column constituting a spring, the bends being meandering bends in which all centers of curvature are positioned on a side of the inner ring with respect to an annular base constituting the spring, and is previously bent toward a side that will be inside, before the engagement is placed in the annular space, a height of a tip end portion to the base is larger than a height of an apex of the second bend to the base, and radii of curvature of the three bends are in a range of 0.2 to 0.6 mm.

In the one-way clutch spring set forth above, the height of the tongue to the base, the radii of curvature of the meandering bends which are formed in the column basal end portion of the tongue, the height of the apex of the lowest positioned bend to the base, and the like are largely related to the degree of the urging force exerted on the sprag by the tongue, and that of a drag torque which is generated between the inner and outer rings in power transmission and interruption between the inner and outer rings. When a one-way clutch spring is configured by the above means, the drag torque can be made smaller than a conventional one while a force urging a sprag is not weakened and a meshing failure in a wedge function and wedge cancellation function of the sprag does not occur.

BRIEF DESCRIPTION OF THE DRAWINGS

FIG. 1 shows a one-way clutch in which the one-way clutch spring of the invention is used.

FIG. 2 shows the one-way clutch spring of the invention.

FIG. 6 shows a conventional one-way clutch configured by a cage, a spring, and sprags serving as engagement members.

FIG. 8 shows a conventional spring used in a one-way clutch.

BEST MODE FOR CARRYING OUT THE INVENTION

Hereinafter, a specific embodiment of the invention will be described with reference to drawings.

Figure 1A:
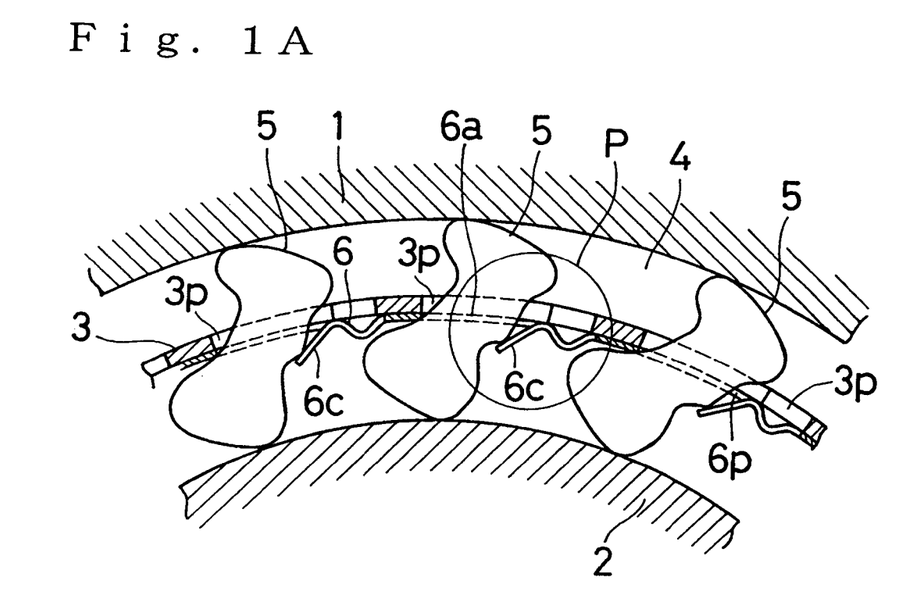
FIG. 1(A) is a partial section view.
Figure 1B:
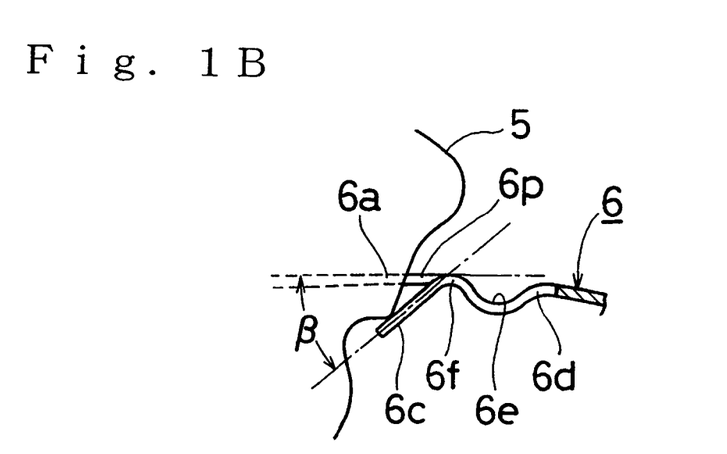
FIG. 1(B) is an enlarged view of portion P of FIG. 1(A).

FIG. 1(A) is a partial section view of a one-way clutch in which the one-way clutch spring of the invention is used, and FIG. 1(B) is an enlarged view of portion P of FIG. 1(A).

The one-way clutch comprises: a cage 3 which is placed in an annular space 4 between an outer ring 1 and an inner ring 2; sprags 5, 5, . . . of an engagement member to be placed in pockets 3p, 3p, . . . which are disposed in the cage 3 circumferentially at regular intervals; and a one-way clutch spring 6 (hereinafter, referred to merely as spring 6) which holds the sprags 5, 5, . . . to pockets 6p, 6p.

Figure 2A:
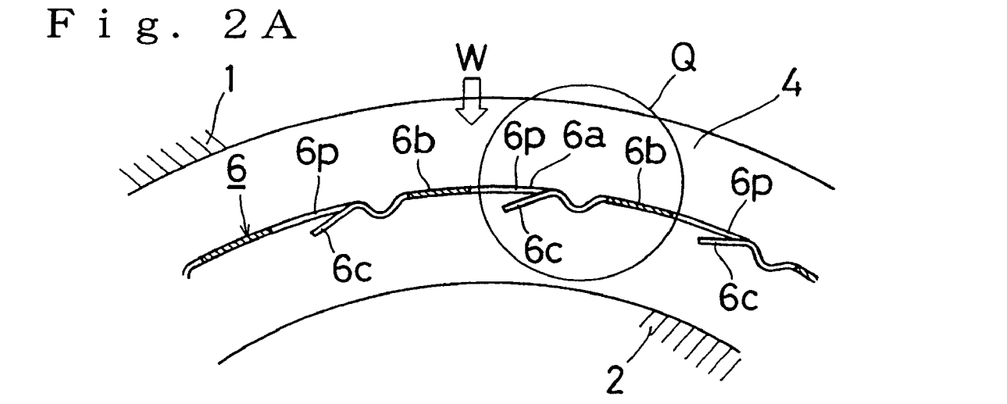
FIG. 2(A) is a partial front view.
Figure 2B:
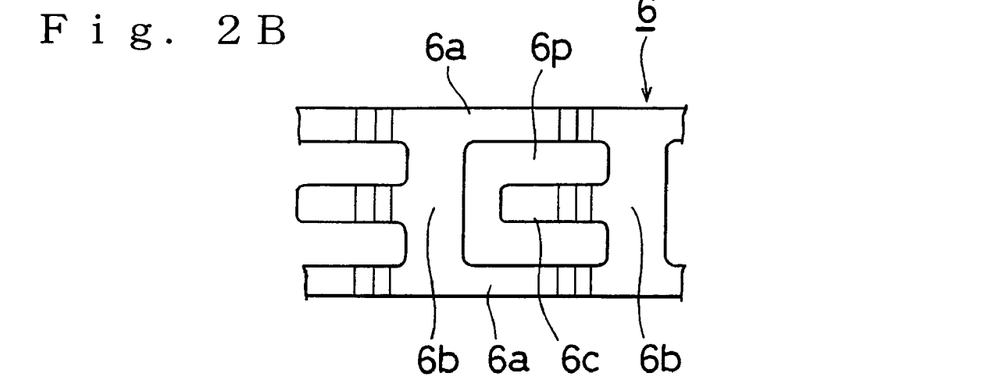
FIG. 2(B) is a plan view as seen in the direction of W in FIG. 2(A)
Figure 2C:
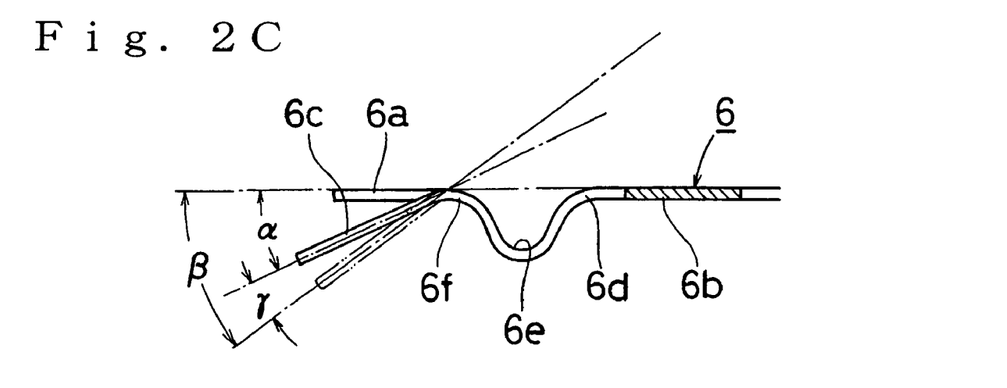
FIG. 2(C) is an enlarged view of portion Q of FIG. 2(A).

FIG. 2(A) is a partial front view showing a placement state of the spring 6 from which sprags 5 are removed away, FIG. 2(B) is a partial plan view as seen in the direction of W in FIG. 2(A), and FIG. 2(C) is an enlarged view of portion Q of FIG. 2(A).

The spring 6 is configured by: a base 6a, 6a which is annular when it is placed in the annular portion 4; columns 6b which connect the base 6a, 6a; the pockets 6p which are formed by the base 6a and the columns 6b; and tongues 6c which elongate toward the pockets 6p from the columns 6b.

In this case, in addition to the cage 3, another cage (not shown) may be disposed at the inner side. The configuration of the spring 6 is basically identical with that shown in FIGS. 5 to 7. When the sprags 5, 5, . . . are to be placed, urging in the engagement direction is conducted by the tongues 6c, 6c, . . . which extend into the pockets 6p from the columns 6b of the spring 6.

Each of the tongues 6c which extend into the pockets 6p is formed so that it has smooth bends 6d, 6e, 6f which are previously bent at a basal end portion of the column 6b before it is placed in the annular space 4, and an initial bending angle α to the annular base 6a is 25°±5°, namely, in the range of 20° to 30°.

As described above, the smooth meandering bends 6d, 6e, 6f are formed in the tongue 6c of the spring 6 which urges the sprag 5, and the sprag 5 is placed in the pocket 6p while the inclination angle α is a value in the range, whereby the displacement angle γ when the sprag 5 is in contact with the tongue 6c is set so that a spring constant which will be described later is attained. Therefore, an adequate urging force is applied to the sprag 5, and the drag torque can be reduced in the case that a power is transmitted and interrupted between the outer ring 1 and the inner ring 2.

Next, the sprags 5, 5, . . . are placed in the pockets 6p, 6p of the spring 6. When they are mounted in the annular space 4 between the outer ring 1 and the inner ring 2, the sprag 5 makes contact to effect displacement as shown in FIG. 2(C). Therefore, the inclination angle β between the base 6a and the tongue 6c is increased in the range where the displacement angle γ is the addition of "10°±5°" to the inclination angle α in the case where the sprag 5 makes no contact, or the spring force of the tongue 6c is increased by displacement in the range of 5° to 15° rather than 20° to 30°.

Figure 4:
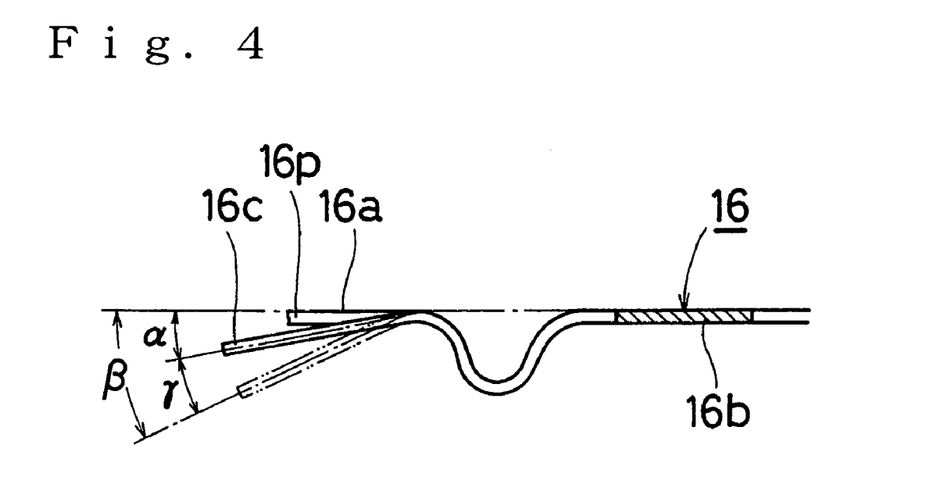
FIG. 4 is a view showing inclination angles of a tongue to a base before a sprag is placed in a pocket of a one-way clutch spring, and in the case where the placed sprag is urged.

Conventionally, as shown in FIG. 4, before placement in the annular space 4, the bend and the initial inclination angle are disposed so that the inclination angle α formed by the base 6a and the tongue 6c is in the range of 5° to 15°, and a spring force is provided by the displacement angle γ of the tongue 6c of the spring 6 in which the sprag 5 is placed in the range of 15° to 25°.

Therefore, the drag torque in engagement and disengagement states of the sprag 5 tends to be increased by the degree corresponding to the increased displacement amount. The inclination angle (α+γ) indicated by the two-dot chain line in FIG. 4 is identical with the angle in the case where the sprag 15 butts against the tongue 16c as shown in FIGS. 6(A) and 6(B).

Figure 3:
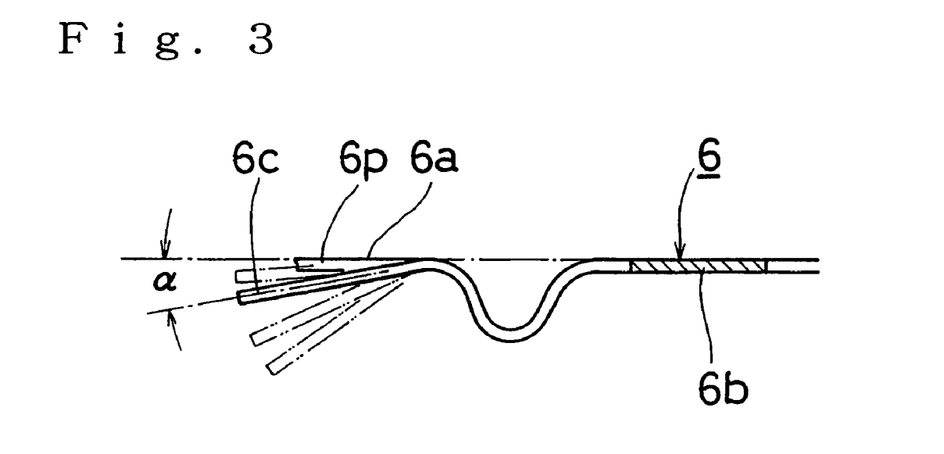
FIG. 3 is a view showing various angles of a tongue which elongates toward a pocket in a one-way clutch spring, to a base.

FIG. 3 shows various angles of the tongue 6c which elongates toward the pocket 6p in the one-way clutch spring 6, to the base 6a.

In the completion of the one-way clutch spring 6 of the invention, tests were conducted while the initial bending angle (spring constant) of the tongues 6c was changed to several kinds (four kinds), the sprags 5 were fitted into the pockets 6p, and the urging force of the tongues 6c against the sprags 5 was changed.

Results are listed in Table 1 below.

TABLE 1

| Displacement angle of tongues | Initial bending angle of tongues α | Idling torque ratio* | Locking property | Employment |
| --- | --- | --- | --- | --- |
| 25° or more | 5° or less | 1 or more | Abnormality occurs before reference | Disabled |
| 20° ± 5° | 10° ± 5° | 1 | No problem | Enabled |
| 10° ± 5° | 25° ± 5° | 0.4-0.6 | No problem | Enabled |

TABLE 1-continued

| Displacement angle of tongues | Initial bending angle of tongues α | Idling torque ratio* | Locking property | Employment |
|---|---|---|---|---|
| 5° or less | 30° or more | 0.4 or less | Abnormality occurs before reference | Disabled |

*The idling torque is a drag torque during idling, and "Idling torque ratio" is a ratio which is 1 in the case where the displacement angle of tongues is 20° ± 5° and the initial bending angle of tongues is 10° ± 5°.

As shown in Table 1, in the case where a spring constant was set so that the displacement angle of the tongues 6c was 25° or more when the sprags 5 were urged while the initial bending angle of the tongues 6c was 5° or less, the drag torque was larger than the conventional one. In the case where the displacement angle of the tongues 6c was 5° or less when the sprags 5 were urged while the initial bending angle was 30° or larger, the drag torque was 0.4 or less when the conventional one was 1. In the both cases, however, abnormality occurred before the reference.

Namely, the engagement function (transmission of power) and cancellation function (interruption of power) of the sprags 5 failed to occur in accordance with each other. In this case, "reference" means, for example, repetition of one million, and a repetition number which is required by the user. However, the conventional reference is the case where a spring constant was set so that the displacement angle of the tongues 6c was about 15° to 25° when the sprags 5 were urged while the initial bending angle of the tongues 6c was 5° to 15°. As in this case, when a spring constant is set so that the displacement angle of the tongues 6c is about 5° to 15° when the sprags 5 are urged while the initial bending angle of the tongues 6c is 20° to 25°, the drag torque is smaller than the conventional one, and there is no problem in power transmission and interruption due to engagement and cancellation of the sprags 5.

Figure 5:
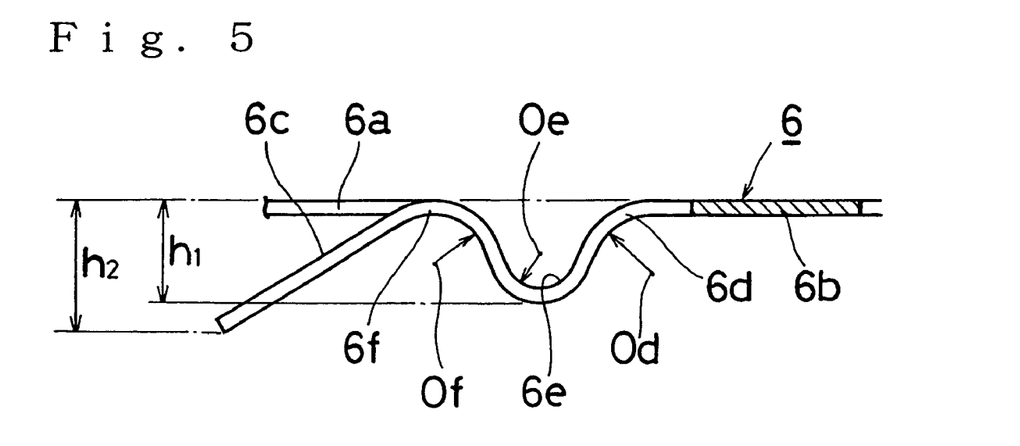
FIG. 5 shows an embodiment of the invention, and is an enlarged view of portion Q of FIG. 2(A).

FIG. 5 is an enlarged view of portion Q of FIG. 2(A). The tongues 6c which extend into the pockets 6p have smooth meandering bends which are previously bent toward a side that will be inside, at a basal end portion of the column 6b before the sprags 5, 5, . . . are placed in the annular space 4. Namely, a first bend 6d, a second bend 6e, and a third bend 6f as seen from the column 6d is formed in each of the tongues 6c.

Furthermore, all the centers of curvature (0d, 0e, 0f) of the bends (6d, 6e, 6f) are positioned on the side of the inner ring 2 with respect to the annular base 6a constituting the spring. The bending is performed so that the height $h_2$ of a tip end portion of the tongue 6c to the base 6a is larger than the height $h_1$ of the apex of the second bend 6e to the base.

The radii of curvature R of the three bends (6d, 6e, 6f) are in the range of 0.2 to 0.6 mm. Namely, from the results of experiments, it was found that, when the radii of curvature of these bends (6d, 6e, 6f) are larger than values of this range, the spring constants of the tongues 6 become small, the force of urging the sprags 5 is weakened, and the drag torque becomes large, and, when the radii of curvature of the bends (6d, 6e, 6f) are smaller than values of this range, the spring constants of the tongues 6 become large, the force of urging the sprags 5 is strengthened, and the drag torque becomes large.

INDUSTRIAL APPLICABILITY

As described above in detail, according to the one-way clutch spring of the invention, 40% to 60% reduction of a drag torque in a usual use range can be realized with respect to a drag torque of an ordinarily designed product. There is no problem in engagement and cancellation of the sprags and the like, and durability can be improved. Furthermore, it is not required to change conventionally used components other than a spring, and only a change of molds for processing the tongues is requested. Therefore, an excessive cost increase does not occur.

According to the invention set forth, about 30% reduction of a drag torque with respect to a spring in which conventional sprags are placed can be realized. There is no problem in engagement and cancellation of sprags and the like, durability is not impaired, and only a change of molds for processing the tongues for a tongue bending R portion is requested. Therefore, an excessive cost increase does not occur.

The invention claimed is:

1. A one-way clutch, comprising:
an outer ring;
an inner ring disposed within said outer ring to define an annular space between the outer ring and the inner ring;
engagement members disposed in said annular space;
a clutch spring formed of a plate spring member which is disposed in said annular space and has pocket openings disposed circumferentially at regular intervals, the pocket openings being defined by base portions of said clutch spring extending in a circumferential direction of said one-way clutch on first and second opposing sides of said pocket openings, and column portions which extend in an axial direction of said one-way clutch and third and fourth opposing sides of said pocket openings;
said engagement members being disposed in said pocket openings;
said clutch spring being formed to have tongues that extend respectively into said pocket openings from said column portions of said clutch spring, said clutch spring being formed such that after formation and prior to introduction of said engagement members into said pocket openings, said tongues extend inclined relative to said base portions so as to define a formed angle in the range of 20° to 30° relative to the base portions when no pressure is applied to the tongues;
said engagement members are disposed in said pocket openings so as to apply pressure to said tongues to deflect said tongues beyond said formed angle thereby producing a bias on said engagement members to move said engagement member toward engagement with said inner ring and outer ring, wherein each of said tongues is deflected by said engagement member in a range of 5° to 15° beyond said formed angle.

2. A one-way clutch, comprising:
an outer ring;
an inner ring disposed within said outer ring to define an annular space between the inner ring and the outer ring;
engagement member disposed in said annular space;
a clutch spring formed of a plate spring member and which is placed in said annular space and has first and second plate spring sides respectively facing said inner ring and said outer ring, and said plate spring member having pocket openings disposed circumferentially at regular intervals, said pocket openings being defined by annular base portions of said clutch spring extending in a circumferential direction of said one-way clutch on first and second opposing sides of said pocket openings, and column portions which extend in an axial direction of said one-way clutch and third and fourth opposing sides of said pocket openings;

said engagement members being disposed in said pocket openings;

said plate spring member having tongues formed therein which extend into said pocket openings from said column portions and which are deflected by contact with said engagement members so as to bias said engagement members;

said tongues being formed in said plate spring member so as to each have sequentially a first bend adjacent a supporting one of said column portions, a second bend, and a third bend, said first, second and third bends being meandering bends each having a center of curvature positioned offset from said first plate spring side of said annular base portions when formed in said plate spring member, and between said inner ring, and said annular base portions when said clutch spring is installed in said annular space, said tongues each terminating in a tip end portion extending from said third bend, and said tip end portion extends inclined relative to said base portions so as to define a formed angle when no pressure is applied to the tongues; and said tongues being so formed in said plate spring member such that prior to disposal in said annular space and said contact with said engagement members, and when in a state absent application of pressure and resultant deflection, a first distance from the tip end portion to said first plate spring side of said annular base portions is larger than a second distance between a most distal point of said second bend to said plate spring side of said annular base portions, and radii of curvature of said first, second and third bends are in a range of 0.2 to 0.6 mm, wherein each of said tongues is deflected by said engagement member in a range of 5° to 15° beyond said formed angle.

* * * * *